K. B. BRITTON.
VALVE.
APPLICATION FILED FEB. 27, 1918.
1,289,104.
Patented Dec. 31, 1918.
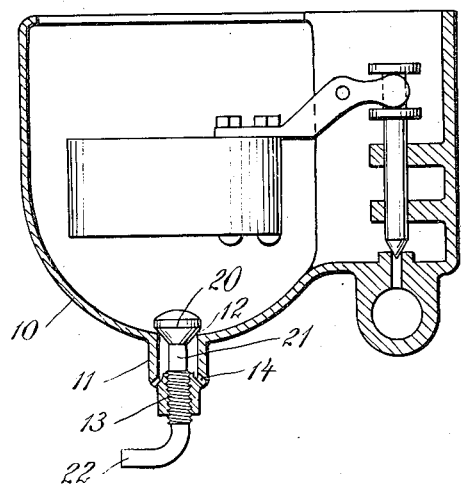
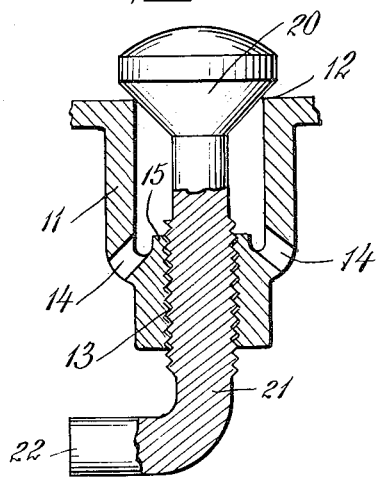
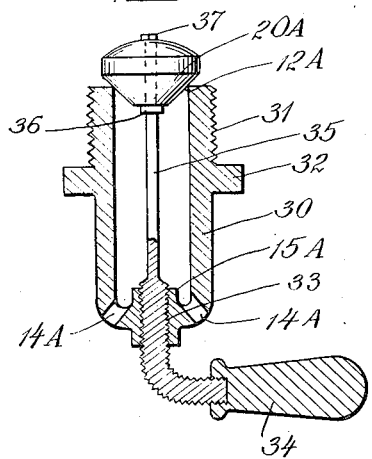
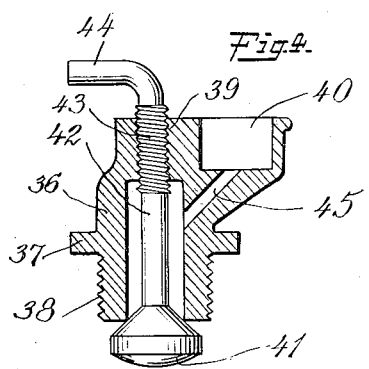
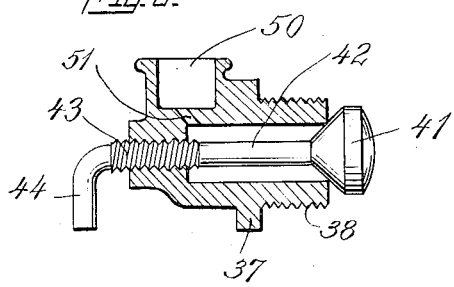
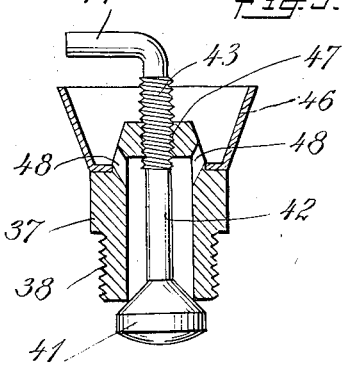
INVENTOR
Karl B. Britton
BY
Marshall & Dearborn
ATTORNEYS

UNITED STATES PATENT OFFICE.

KARL B. BRITTON, OF EAST CLEVELAND, OHIO, ASSIGNOR TO PETER A. FRASSE & CO. INC., OF NEW YORK, N. Y., A CORPORATION OF NEW YORK.

VALVE.

1,289,104. Specification of Letters Patent. Patented Dec. 31, 1918.

Continuation of application Serial No. 94,558, filed May 1, 1916. This application filed February 27, 1918. Serial No. 219,361.

*To all whom it may concern:*

Be it known that I, KARL B. BRITTON, a citizen of the United States, and a resident of East Cleveland, Cuyahoga county, and State of Ohio, have invented certain new and useful Improvements in Valves, of which the following is a specification, reference being had to the accompanying drawings, forming a part thereof.

My invention relates to improvements in pet cocks, relief valves, priming cups and the like, and its object is to provide a device of this character which is extremely simple in construction and of which the valve will be positively seated when closed without requiring any niceties of construction or adjustment. It is also a self-cleaning device which, unlike such structures as have been available heretofore, will not become clogged up.

A further object of my invention is to provide a pet cock or similar device in which the valve is drawn onto its seat and moves toward the outlet opening so that the pressure of the fluid confined tends to close the valve. I also make the valve member inseparable from the casing of the device so that it cannot become removed and lost.

Another object of my invention is to provide a simple and improved priming cup particularly adapted for automobile engines.

In order that my invention may be thoroughly understood, I will now proceed to describe the same in the following specification and then point out the novel features thereof in appended claims.

Referring to the drawings:

Figure 1 is a sectional elevation of the float feed chamber of a carbureter, with the lower portion thereof constructed to form a part of a pet cock which embodies the present invention.

The portion of the structure of Fig. 1 which embodies this invention, is shown on an enlarged scale in Fig. 2, in sectional elevation.

Fig. 3 is a sectional elevation of a modified form of structure which also embodies this invention, the device in this figure being a unitary structure capable of being affixed to any desired apparatus.

Fig. 4 is a sectional elevation of a priming cup arranged and constructed in accordance with my invention, and Figs. 5 and 6 are views corresponding to Fig. 4, of further modifications of my invention.

Like characters of reference designate corresponding parts in all the figures.

10 designates the body or bowl of the float feed chamber of a carbureter. The lower part of this bowl is constructed to form a downwardly projecting hollow lug 11 which forms the casing of the pet cock. The upper periphery of the bore of this casing is designated by 12 and forms the seat for the valve. The lower end of the lug 11 is somewhat smaller in diameter and is provided with a hole in axial alinement with the hole above it, and is tapped to have a left hand screw-thread 13. 14 are holes bored through the lug into the space above the threaded hole, the threaded portion preferably being extended up somewhat above these holes as shown at 15.

The valve member has a frusto-conical head 20 which is adapted to be drawn down upon the valve seat 12, and a shank 21 upon which are left-hand threads the same in pitch as those in the hole 13, but which may be smaller in size. The lower end of this shank below the thread is bent over at right angles as at 22 to form a handle, by means of which the manipulation of the device is facilitated.

Before specifically describing the modified form of the device which is illustrated in Fig. 3, I will point out the operation of the structure shown in Figs. 1 and 2. When the parts are in the positions in which they are shown in these figures, the valve is closed. A left-hand turn of the shank 21 will cause the valve head to be raised from the seat 12 and any fluid or other matter which has been retained by it may pass down through the casing and out through the holes 14. It is clear that it will be self-flushing and that any extraneous matter which may have been caught above the valve head will be disturbed and dislodged first by the upward movement of the valve head which is preferably crowned to act as a shed and then will be washed down through the holes 14.

When the spindle is turned in the opposite direction, the valve head will be drawn onto its seat. The loose connection between the screw threads provides for a certain amount of lateral movement of the valve head relatively to its seat, and insures its proper seating with an equal pressure upon all portions of the seat. Moreover, this loose connection between the screw threads is of a distinct manufacturing advantage as no fitting of these parts is required. It is obvious that there is no leakage through the threads as they are not on the pressure side of the valve head.

Attention is particularly directed to the fact that the valve moves onto its seat in the direction of flow of fluid toward the outlet, and consequently fluid pressure within the receptacle tends to hold the valve on its seat. It will of course be understood that while the loose thread feature above described is desirable, it is not essential and in fact other means for drawing the valve onto its seat may be employed. For example, the stem may extend through a suitable hole in the casing and be actuated by a cam forming part of the handle.

The structure of the pet cock of Figs. 1 and 2, may obviously be utilized as a removable independent structure by merely making the casing 11 to correspond to the casing 30 of the modification shown in Fig. 3, which will now be described.

In the structure shown in Fig. 3, the casing 30 is a separate member provided with screw-threads at 31 by means of which it may be affixed to a desired structure, and provided with a flange 32 which, in common with the usual practice, may be flattened to form polygonal sides to which a wrench may be applied.

In this case the valve seat is designated by 12$^A$ and the valve head by 20$^A$. The lower part of the casing 30 is threaded to receive the threaded part 33 of the valve actuating shank. The threaded shank is shown bent over at right angles below the casing and a handle 34 screwed onto it.

Above the threaded part the shank is made of small diameter as shown at 35. This passes through the valve head and a collar 36 is provided to limit the position of the valve head thereon. 37 is a nut or riveted washer on the shank above the valve head by means of which it is fastened to the shank. The head of course may be integral with the shank if desired.

14$^A$ are outlet holes near the bottom of the casing and 15$^A$ the projection which raises the threaded parts above the upper ends of these holes.

The operation of this device is similar to that of the other, and in this case the flexibility of the shank 35 is depended upon to give lateral movement to the valve head if any is required to properly seat the valve.

In Fig. 4 I have shown a priming cup which constitutes an embodiment of my invention and comprises a body 36 having a wrench receiving portion 37, an externally threaded portion 38 at one end and an internally threaded portion 39 at the opposite end. The externally threaded end is adapted to be screwed into a tapped hole in the cylinder and the opposite end is enlarged to form a cup 40 into which gasolene or the like may be introduced. In addition to the body, the priming cup comprises a valve having an enlarged valve head 41 at one end and a stem 42 provided with a screw-threaded portion 43 which coöperates loosely with the threaded portion 39 of the body. The outer end of the stem is bent at an angle to constitute a handle 44. The passage 45 connects the cup with the interior of the body above the valve. The portion 39 of the body and the stem are preferably provided with left hand threads in order that the handle 44 may be turned to the right for closing the valve and to the left for opening, as the natural way of opening and closing the valve. At the same time the valve is not forced outwardly onto its seat but in closing is drawn upwardly, in a direction opposite to the flow of fluid, or, in other words, it opens in the direction of flow. The loose threads allow the valve to seat itself as in the structures hereinbefore described.

Instead of having the cup formed to one side of the tapped hole 39 the cup may be formed concentric with the tapped member, and may be either integral or formed of a separate piece, as shown in Fig. 5. In this modification the cup is designated 46, the central tapped lug 47 and inclined passages 48 are provided in place of the passage 45.

The structure may readily be adapted for use in a horizontal position such as for example, on the side of the engine cylinder. This modification is shown in Fig. 6 and differs from that of Fig. 4 only in that the cup is formed with its opening at right angles to the stem instead of parallel to it. The cup is here designated 50, and the connecting passage 51.

I have shown several forms of my invention to indicate that I do not limit myself to any specific form of construction, and I intend no limitations other than those imposed in the appended claims.

What I claim is:

1. A valve comprising a tubular casing having a constricted internally-threaded portion near one end having a lug projecting inwardly to form an annular recess, a circular valve seat at the other end and intermediate discharge outlets opening into the annular recess and a valve beyond the end of the tube having a head tapered to coöperate with the valve seat and crowned on its outer surface, and a valve stem rigidly affixed to the valve and having an undersized threaded section to coöperate loosely with the internally threaded portion of the tubular casing to render the valve self-seating, said stem being formed at its outer end to provide a handle.

2. A valve comprising a cup-shaped casing having an upwardly extending lug in the bottom and discharge openings below the top of the lug, a circular valve seat at the top and a tapped hole in the lug, and a unitary valve having a head above the cup and adapted to be drawn onto the seat, and a stem screw-threaded undersize to coöperate loosely with the tapped hole in the lug.

3. A valve comprising a cup-shaped casing having an upwardly extending lug in the bottom and discharge openings below the top of the lug, a circular valve seat at the top and a tapped hole in the lug, and a unitary valve having a head above the cup and adapted to be drawn onto the seat, and a stem screw threaded under size to coöperate loosely with the tapped hole in the lug and having its outer end bent at an angle to form a handle.

4. A valve comprising a casing having a circular valve seat at one end and a threaded portion spaced from said seat, the center of the seat lying in the axis of the said threaded portion, the casing also having an opening for the passage of fluid, a unitary valve member comprising a tapered valve head and a threaded shank rigidly connected therewith and coöperating with the threaded portion of said casing for moving said valve head into and away from the valve seat and arranged to permit lateral movements of the valve head.

5. A valve comprising a casing having a circular valve seat at the top and an inwardly extending lug spaced from said seat, at the bottom, having a tapped hole, the center of the seat lying in the axis of the tapped hole, the casing having also a discharge opening below the inner end of the lug; a unitary valve member comprising a tapered valve head and a threaded shank, rigidly connected therewith and coöperating with the tapped hole for moving said valve head into and away from the valve seat and arranged to permit lateral movements of the valve head.

In witness whereof I have hereunto set my hand this 30th day of January, 1918.

KARL B. BRITTON.